3,210,388
13α-FLUORO-17β-METHYL-18-NOR STEROIDS
Lawrence H. Knox, Mexico City, Mexico, assignor to Syntex Corporation, Panama, Panama, a corporation of Panama
No Drawing. Filed Mar. 23, 1964, Ser. No. 354,126
Claims priority, application Mexico, July 27, 1962, 68,398
16 Claims. (Cl. 260—397.3)

This application is a continuation in part of my copending patent application Serial No. 221,424, filed September 5, 1962, now abandoned.

The present invention relates to certain novel cyclopentanophenanthrene derivatives and to the method for making the same.

More particularly, it relates to a process for making certain novel 13α-fluoro-17β-methyl-18-nor derivatives of the androstane and estrane series represented by the following formulas:

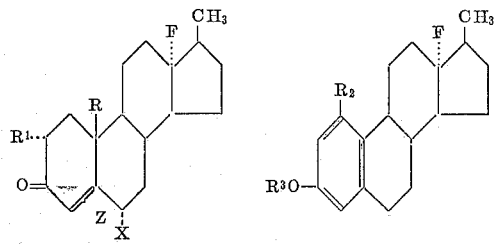

In the above formulas R, R¹ and R² each represent hydrogen or methyl; R³ represents a lower alkyl group; Z represents a double bond or a saturated linkage between C-4 and C-5 and X represents hydrogen, methyl, chlorine or fluorine.

The present invention refers also to certain novel 17β-methyl-Δ¹³-18-nor, 17β-fluoro- and 17α-chlorofluoroacetoxy derivatives of the androstane and estrane series, which are obtained as by-products in practicing the process of the present invention.

The androstane compounds of the present invention are anabolic agents with a favorable anabolic-androgenic ratio; in addition they have anti-estrogenic, anti-gonadotrophic and anti-fibrillatory properties, lower the blood cholesterol level and inhibit the activity of the pituitary gland.

The estrone derivatives are estrogenic type hormones having anti-androgenic and anti-progestational properties, and very low feminizing effect. In addition they are useful in fertility control.

The substitution of primary and secondary hydroxyl groups by a fluorine atom has been described in the literature, for example, by N. N. Yarovenko et al. in the Journal of General Chemistry of the USSR, vol. 29, 2159 (1959).

In my copending patent application Serial No. 353,263, filed March 19, 1964, there has been described the transformation of 17β-secondary hydroxy steroids into a mixture of 17α-fluoro, 17β-chlorofluoroacetoxy and 17β-methyl compounds, by reaction with 2-chloro-1,1,2-trifluorotriethylamine.

In accordance with the present invention the surprising discovery has been made that when a 17α-hydroxy steroid of the androstane or estrane series is treated with the abovementioned α-fluorinated amine, in a suitable organic solvent, the substitution of the hydroxyl group by fluorine occurs in a very small amount and in contrast, the main products obtained by this reaction are the 13α-fluoro-17β-methyl and 17β-methyl-Δ¹³-compounds. There is also obtained a small amount of the 17α-chlorofluoroacetoxy compounds.

This method is illustrated by the following equation wherein only rings C and D are depicted:

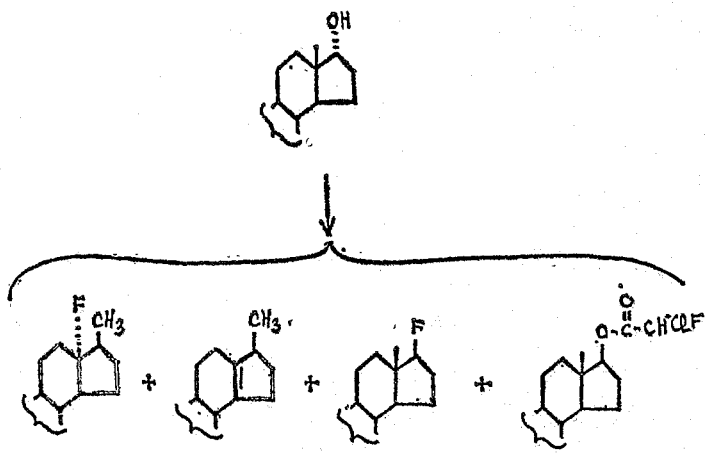

The starting materials for the process of the present invention are epitestosterone, 19-nor-epitestosterone, androstan-17α-ol-3-one, 19-nor-androstan-17α-ol-3-one, the 2 or 6 substituted derivatives thereof, 17α-estradiol, 1-methyl-17α-estradiol whose hydroxyl group at C-3 is protected in the form of an ether, preferably the methyl ether. By reaction of these compounds with 1 to 1.5 molar equivalents of 2-chloro-1,1,2-trifluorotriethylamine in an inert organic solvent, at a temperature comprised between room temperature and reflux for a period of time between 30 minutes and 20 hours, followed by evaporation of the solvent and chromatography of the residue on Florisil or neutral alumina, there are produced the corresponding 13α-fluoro-17β-methyl-18-nor, 17β - methyl - Δ$^{13}$ - 18-nor-, 17β-fluoro- and 17α-chlorofluoroacetoxy compounds.

Adequate solvents for this reaction are acetonitrile; ethers such as diethylether, isopropyl ether, tetrahydrofuran, dioxane, Dowanol and the like; aromatic hydrocarbons such as benzene, toluene, xylene, etc.; in general, the reaction can be carried out in any organic solvent without acidic hydrogen.

In addition to the aforementioned starting materials, the process of the present invention can be carried out using any 17α-hydroxy androstane or estrane compound having different substituents at C–2, C–4, C–6, C–7, etc., which do not react with the fluorinated amine; additional double bonds at C–1, 2, C–6, 7, etc. may also be present in the starting materials.

The following examples serve to illustrate but are not intended to limit the scope of the present invention:

PREPARATION I

To a suspension of 7.5 g. of 17α-estradiol in 25 cc. of acetone there was added a solution of 70 g. of potassium hydroxide in 37.5 cc. of water and the stirred mixture was treated dropwise with 40 cc. of methyl sulfate. The reaction mixture was then stirred for 45 minutes further, poured into dilute hydrochloric acid solution and the formed precipitate collected by filtration. Crystallization from chloroform-methanol gave the 3-methyl ether of 17α-estradiol.

A cold solution of 6 g. of 17α-estradiol-3-methyl ether in 750 cc. of anhydrous ether was added to 900 cc. of liquid ammonia and then 7.8 g. of lithium wire over 10 minutes, with constant stirring. The mixture was stirred for 20 minutes more, 160 cc. of absolute ethanol were then cautiously added and the ammonia was allowed to evaporate. Water was added to the residue, the ether distilled off and the resulting 3-methoxy-Δ$^{2,5(10)}$-19-nor-androstadien-17α-ol collected, washed with water and dried.

A mixture of the foregoing crude compound, 220 cc. of methanol and 132 cc. of 3 N hydrochloric acid was heated at 60° C. for 18 minutes. The solution was cooled, poured into iced water and the resulting precipitate was collected, washed with water and dried. Crystallization from acetone-hexane yielded the pure 19-nor-epitestosterone.

PREPARATION II

In a nitrogen atmosphere, a mixture of 5 g. of epitestosterone in 20 cc. of anhydrous thiophene-free benzene, 5 cc. of ethyl oxalate and 1.5 g. of sodium hydride was stirred for 4 hours. The precipitated sodium salt of the 2-ethoxyoxalate and the excess sodium hydride were filtered off, washed with benzene, then hexane, and dried for several hours in vacuo. The product was cautiously added in portions to a stirred ice-cold dilute hydrochloric acid solution, liberating the free ethoxyoxalate which was extracted with methylene dichloride. The extract was washed with water, dried and evaporated. The residue was taken up in 110 cc. of acetone, 5 g. of finely powdered anhydrous potassium carbonate and 15 cc. of methyl iodide were added and the mixture boiled under reflux for 48 hours. The filtered solution was evaporated almost to dryness, water added, the residue extracted with methylene chloride and the extract washed with 1% sodium hydroxide solution, water, dried and evaporated to dryness. The residue was dried at 90° C. for 2 hours in vacuo and then treated with a solution of sodium ethoxide prepared from 0.5 g. of sodium and 50 cc. of absolute ethanol. The solution was allowed to stand for 48 hours at room temperature and then poured into 100 cc. of water. Without neutralization, the mixture was extracted with methylene dichloride and the organic extract washed with water to neutral, dried and evaporated. Chromatography of the residue on neutral alumina gave the pure 2α-methyl-Δ$^4$-androsten-17α-ol. (2α-methyl-epitestosterone.)

In a similar manner, starting from 19-nor-epitestosterone there was produced 2α-methyl-19-nor-Δ$^4$-androsten-17α-ol.

PREPARATION III

A mixture of 5 g. of epitestosterone, 60 cc. of 2-methyl-2-ethyl-1,3-dioxolane and 140 mg. of p-toluenesulfonic acid was heated to boiling and refluxed with distillation for 1 hour. The mixture was cooled, diluted with water, extracted with ethyl acetate and the organic extract washed to neutral, dried and evaporated to dryness. Crystallization from acetone-hexane yielded 3-ethylenedioxy Δ$^5$-androsten-17α-ol.

A solution of 4 g. of the foregoing ketal in 150 cc. of chloroform was cooled to 0° C. and mixed with 1.1 molar equivalents of monoperphthalic acid in ether solution. The mixture was kept at 0° C. for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 3-ethylenedioxy-5α,6α-oxido-androstan-17α-ol.

To a solution of 40 cc. of 4 N methylmagnesium bromide in ether was added, with stirring, a solution of 2 g. of the preceding 5α,6α-oxido derivative in 50 cc. of dry tetrahydrofuran and the stirred mixture heated under reflux for 30 minutes. The condenser was then replaced by a calcium chloride tube, the ether allowed to boil off and when the internal temperature reached 54° C., the condenser was readapted and the mixture refluxed for an additional 4 hours. 200 cc. of a saturated solution of ammonium chloride was added slowly to the cooled mixture which was then stirred for 15 minutes before transfer to a separatory funnel. Ethylacetate was added, the organic layer separated, washed, dried and evaporated, whereupon crystallization of the residue from aqueous methanol gave 3-ethylenedioxy-6β-methyl-androstane-5α,17α-diol.

Into a suspension of 1 g. of the foregoing compound in 35 cc. of glacial acetic acid, there was passed a slow stream of dry hydrochloric acid; after 10 minutes all the solid material was dissolved. The gas was passed through the reaction mixture for a total of 5 hours. The solution was concentrated to about one third its initial volume by distillation under reduced pressure at 35° C., then it was poured into ice-water. The precipitate formed was collected, washed with water to neutrality and dried. Recrystallization from methylene chloride afforded 6α-methyl-Δ$^4$-androsten-17α-ol-3-one.

By the same method, starting from 19-nor-epitestosterone there was obtained 6α-methyl-19-nor-Δ$^4$-androsten-17α-ol-3-one as final product.

PREPARATION IV

A suspension of 5 g. of epitestosterone in 40 cc. of anhydrous peroxide-free dioxane was treated with 6 cc. of freshly distilled ethyl orthoformate and 4 g. of p-toluenesulfonic acid. The mixture was stirred at room temperature for 15 minutes and the resulting solution let stand for 30 minutes further. 4 cc. of pyridine were added and then water. The formed precipitate was collected by filtration, water washed and air dried. Recrystallization from acetone-hexane afforded 3-ethoxy-Δ$^{3,5}$-androstadien-17α-ol.

A mixture of 5 g. of the foregoing compound, 2 g. of anhydrous sodium acetate and 100 cc. of acetone was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C. for 30 minutes. It was then diluted with water, kept overnight at 0° C. and the precipitate formed was collected, washed with water, dried under vacuum and recrystallized from acetone thus giving 6β-chloro-Δ$^4$-androsten-17α-ol-3-one.

Upon reaction of this 6β-chloro compound with hydrogen chloride in glacial acetic acid, in accordance with the method described in Preparation III, there was obtained 6α-chloro-Δ⁴-androsten-17α-ol-3-one.

In a similar manner but using 19-nor-epitestosterone as starting material there was obtained as final product 6α-chloro-19-nor-Δ⁴-androsten-17α-ol-3-one.

PREPARATION V

A solution of 2 g. of 3-ethoxy-Δ³,⁵-androstadien-17α-ol in 50 cc. of dimethylformamide was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. The residue was then treated with hydrogen chloride in acetic acid, to invert the steric configuration at C-6, and the product purified by chromatography on neutral alumina. There was thus obtained 6α-fluoro-Δ⁴-androsten-17α-ol-3-one.

By the same method, starting from 3-ethoxy-19-nor-Δ³,⁵-androstadien-17α-ol there was obtained 6α-fluoro-19-nor-Δ⁴-androsten-17α-ol-3-one.

PREPARATION VI

A suspension of 0.5 g. of 5% palladium on carbon catalyst in 50 cc. of methanol was hydrogenated for 30 minutes. A solution of 2 g. of 2α-methyl-Δ⁴-androsten-17α-ol in 200 cc. of methanol was added to the catalyst and stirred under a hydrogen atmosphere until the uptake of hydrogen ceased. After removal of the catalyst by filtration the solution was evaporated and the crude residue was purified by crystallization from methylene-chloride-hexane, thus giving 2α-methyl-androstan-17α-ol-3-one in pure form.

In a similar manner, the compounds mentioned below under I were converted into the corresponding saturated derivatives II:

| I | II |
|---|---|
| 2α-methyl-19-nor-Δ⁴-androsten-17α-ol-3-one. | 2α-methyl-19-nor-androstan-17α-ol-3-one. |
| 6α-methyl-Δ⁴-androsten-17α-ol-3-one. | 6α-methyl-androstan-17α-ol-3-one. |
| 6α-methyl-19-nor-Δ⁴-androsten-17α-ol-3-one. | 6α-methyl-19-nor-androstan-17α-ol-3-one. |
| 6α-fluoro-Δ⁴-androsten-17α-ol-3-one. | 6α-fluoro-androstan-17α-ol-3-one |
| 6α-fluoro-19-nor-Δ⁴-androsten-17α-ol-3-one. | 6α-fluoro-19-nor-androstan-17α-ol-3-one. |
| 6α-chloro-Δ⁴-androsten-17α-ol-3-one. | 6α-chloro-androstan-17α-ol-3-one. |
| 6α-chloro-19-nor-Δ⁴-androsten-17α-ol-3-one. | 6α-chloro-19-nor-androstan-17α-ol-3-one. |

PREPARATION VII

A mixture of 5 g. of epitestosterone in 100 cc. of dioxane and 3.5 g. of 2,3-dichloro-5,6-dicyano-1,4-benzoquinone was refluxed for 10 hours. It was then cooled, the 2,3 - dichloro - 5,6 - dicyano - 1,4 - benzohydroquinone formed during the reaction filtered off, and the filtrate evaporated to dryness. The residue was dissolved in acetone and filtered through 100 g. of alumina. Crystallization from acetone-hexane gave Δ¹,⁴-androstadien-17α-ol-3-one.

A mixture of 3 g. of the foregoing diene, 600 mg. of p-toluenesulfonic acid and 120 cc. of acetic anhydride was heated for 5 hours on the steambath; the cooled solution was poured carefully onto ice water and the mixture stirred for 30 minutes to effect hydrolysis of the excess anhydride. The solid product was collected by filtration, washed with water and air dried, thus producing the 3,17-diacetate of 1-methyl-17α-estradiol.

A solution of 1 g. of the diacetate in 50 cc. of 1% potassium hydroxide solution in methanol was refluxed for 1 hour, poured into water and the formed precipitate collected by filtration. Crystallization from chloroform-methanol gave the pure 1-methyl-17α-estradiol.

Upon reaction of the preceding compound with dimethyl sulfate in the presence of alkali, in accordance with the method of Preparation I, there was produced— 1-methyl-3-methoxy-Δ¹,³,⁵(¹⁰)-estratrien-17α-ol.

*Example I.*

A mixture of 8.7 g. of epitestosterone, 8.5 g. of 2-chloro-1,1,2-trifluorotriethylamine (1.5 molar equivalents) and 100 cc. of anhydrous tetrahydrofuran was stirred at room temperature for 14 hours. It was then evaporated under vacuo at room temperature and the residue chromatographed on 400 g. of Florisil, thus producing in pure form 13α - fluoro - 17β - methyl - 18 - nor - Δ⁴ - androsten-3-one, M.P. 118–119° C. [α]$_D$+101° (CHCl$_3$) λmax. 240–242 mμ, log. ε 4.34; νmax. 1670, 1615 cm.⁻¹ (enone); 17β - methyl - 18 - nor - Δ⁴,¹³ - androstadien - 3-one; M.P. 112–113° C.; [α]$_D$+69° (CHCl$_3$); λmax. 238–240 mμ, log. ε 4.23; small amounts of 17β-fluoro-Δ⁴-androsten-3-one and 17α-chlorofluoroacetoxy-Δ⁴-androsten-3-one were also obtained.

*Example II*

To a solution of 2 g. of epitestosterone in 50 cc. of methylene chloride there were added 1.5 molar equivalents of 2-chloro-1,1,2-trifluorotriethylamine, and the reaction mixture was refluxed for 20 minutes under anhydrous conditions. Evaporation under reduced pressure and chromatography of the residue on Florisil afforded 13α - fluoro - 17β - methyl - 18 - nor - Δ⁴ - androsten - 3 - one, 17β - methyl - 18 - nor - Δ⁴,¹³ - androstadien - 3 - one, 17β - fluoro - Δ⁴ - androsten - 3 - one and 17α - chlorofluoroacetoxy-Δ⁴-androsten-3-one, identical to the products obtained in the preceding example.

*Example III*

Example I was repeated but using acetonitrile as solvent, with the same results.

*Example IV*

Example II was repeated, but using ether as solvent, with the same results.

*Example V*

By following the method of Example I, the compounds mentioned below under I were converted into the products set forth under II, which were separated by chromatography:

| I | II |
|---|---|
| 19-nor-androstan-17α-ol-3-one. | 13α-fluoro-17β-methyl-18,19-bisnor-androstan-3-one, 17β-methyl-18,19-bisnor-Δ¹³-androsten-3-one, 17β-fluoro-19-nor-androstan-3-one and 17α-chlorofluoroacetoxy-19-nor-androstan-3-one. |
| 2α-methyl-Δ⁴-androsten-17α-ol-3-one. | 2α,17β-dimethyl-13α-fluoro-18-nor-Δ⁴-androsten-3-one, 2α,17β-dimethyl-18-nor-Δ⁴,¹³-androstadien-3-one, 2α-methyl-17β-fluoro-Δ⁴-androsten-3-one and 2α-methyl-17α-chlorofluoroacetoxy-Δ⁴-androsten-3-one. |
| 2α-methyl-androstan-17α-ol-3-one. | 2α,17β-dimethyl-13α-fluoro-18-nor-androstan-3-one, 2α,17β-dimethyl-18-nor-Δ¹³-androsten-3-one, 2α-methyl-17β-fluoro-androstan-3-one and 2α-methyl-17α-chlorofluoroacetoxy-androstan-3-one. |
| 2α-methyl-19-nor-Δ⁴-androsten-17α-ol-3-one. | 2α,17β-dimethyl-13α-fluoro-18,19-bisnor-Δ⁴-androsten-3-one, 2α,17β-dimethyl-18,19-bisnor-Δ⁴,¹³-androstadien-3-one, 2α-methyl-17β-fluoro-Δ⁴-androsten-3-one and 2α-methyl-17α-chlorofluoroacetoxy-Δ⁴-androsten-3-one. |
| 2α-methyl-19-nor-androstan-17α-ol-3-one. | 2α,17β-dimethyl-13α-fluoro-18,19-bisnor-androstan-3-one, 2α,17β-dimethyl-18,19-bisnor-Δ¹³-androsten-3-one, 2α-methyl-17β-fluoro-19-nor-androstan-3-one and 2α-methyl-17α-chlorofluoroacetoxy-19-nor-androstan-3-one. |
| 6α-methyl-Δ⁴-androsten-17α-ol-3-one. | 6α,17β-dimethyl-13α-fluoro-18-nor-Δ⁴-androsten-3-one, 6α,17β-dimethyl-18-nor-Δ⁴,¹³-androstadien-3-one, 6α-methyl-17β-fluoro-Δ⁴-androsten-3-one and 6α-methyl-17α-chlorofluoro-acetoxy-Δ⁴-androsten-3-one. |

| I | II |
|---|---|
| 6α-methyl-androstan-17α-ol-3-one. | 6α,17β-dimethyl-13α-fluoro-18-nor-androstan-3-one, 6α,17β-dimethyl-18-nor-Δ¹³-androsten-3-one, 6α-methyl-17β-fluoro-androstan-3-one and 6α-methyl-17α-chlorofluoro-acetoxy-androstan-3-one. |
| 6α-methyl-19-nor-Δ⁴-androsten-17α-ol-3-one. | 6α,17β-dimethyl-13α-fluoro-18,19-bisnor-Δ⁴-androsten-3-one, 6α,17β-dimethyl-18,19-bisnor-Δ⁴,¹³-androstadien-3-one, 6α-methyl-17β-fluoro-19-nor-Δ⁴-androsten-3-one and 6α-methyl-17α-chlorofluoro-acetoxy-19-nor-Δ⁴-androsten-3-one. |
| 6α-methyl-19-nor-androstan-17α-ol-3-one. | 6α,17β-dimethyl-13α-fluoro 18,19-bisnor-androstan-3-one, 6α,17β-dimethyl-18,19 bisnor-Δ¹³-androsten-3-one, 6α-methyl-17β-fluoro-19-nor-androstan-3-one, and 6α-methyl-17α-chlorofluoro acetoxy-19-nor-androstan-3-one. |
| 6α-chloro-Δ⁴-androsten-17α-ol-3-one. | 6α-chloro-13α-fluoro-17β-methyl-18-nor-Δ⁴-androsten-3-one, 6α-chloro-17β-methyl-18-nor-Δ⁴,¹³-androstadien-3-one, 6α-chloro-17β-fluoro-Δ⁴-androsten-3-one and 6α-chloro-17α-chlorofluoro-acetoxy-Δ⁴-androsten-3-one. |
| 6α-cholor-androstan-17α-ol-3-one. | 6α-chloro-13α-fluoro-17β-methyl-18-nor-androstan-3-one, 6α-chloro-17β-methyl-18-nor-Δ¹³-androsten-3-one, 6α-chloro-17β-fluoro-androstan-3-one and 6α-chloro-17α-chlorofluoro-acetoxy-androstan-3-one. |
| 6α-chloro-19-nor-Δ⁴-androsten-17α-ol-3-one. | 6α-chloro-13α-fluoro-17β-methyl-18,19-bisnor-Δ⁴-androsten-3-one, 6α-chloro-17β-methyl-18,19-bisnor-Δ⁴,¹³-androstadien-3-one, 6α-chloro-17β-fluoro-19-nor-Δ⁴-androsten-3-one and 6α-chloro-17α-chlorofluoroacetoxy-Δ⁴-androsten-3-one. |
| 6α-chloro-19-nor-androstan-17α-ol-3-one. | 6α-chloro-13α-fluoro-17β-methyl-18,19-bisnor-androstan-3-one, 6α-chloro 17β-methyl-18,19-bisnor-Δ¹³-androsten-3-one, 6α-chloro-17β-fluoro-19-nor androstan-3-one and 6α-chloro-17α-chlorofluoroacetoxy-19-nor-androstan-3-one. |
| 6α-fluoro-Δ⁴-androsten-17α-ol-3-one. | 6α, 13α-difluoro-17β-methyl-18-nor-Δ⁴-androsten 3-one, 6α-fluoro-17β-methyl-18-nor-Δ⁴,¹³-androstadien-3-one, 6α,17β-difluoro-Δ⁴-androsten-3-one and 6α-fluoro-17α-chlorofluoroacetoxy-Δ⁴-androsten-3-one. |
| 6α-fluoro-androstan-17α-ol-3-one. | 6α,13α-difluoro-17β-methyl-18-nor-androstan-3-one, 6α-fluoro-17β-methyl-18-nor-Δ¹³-androsten-3-one, 6α,17β-difluoro-androstan-3-one and 6α-fluoro-17α, chlorofluoroacetoxy-androstan-3-one. |
| 6α-fluoro-19-nor-Δ⁴-androsten-17α-ol-3-one. | 6α,13α-difluoro-17β-methyl-18,19-bisnor-Δ⁴-androsten-3-one, 6α-fluoro-17β-methyl-18,19-bisnor-Δ⁴,¹³-androstadien 3-one, 6α,17β-difluoro-19-nor-Δ⁴-androsten-3-one, and 6α-fluoro-17α-chlorofluoroacetoxy-19-nor-Δ⁴-androsten-3-one. |
| 6α-fluoro-19-nor-androstan-17α-ol-3-one. | 6α,13α-difluoro-17β-methyl-18,19-bisnor-androstan-3-one, 6α-fluoro-17β-methyl-18,19-bisnor-Δ¹³-androsten-3-one, 6α,17β-difluoro-19-nor-androstan-3-one and 6α-fluoro-17α-chlorofluoroacetoxy-19-nor-androstan-3-one. |

*Example VI*

Example II was repeated but using androstan 17α-ol-3-one as starting material, thus producing 13α-fluoro-17β-methyl - 18 - nor - androstan - 3 - one, 17β - methyl - 18 - nor - Δ¹³ - androsten - 3 - one, 17β - fluoro - androstan - 3 - one and 17α - chlorofluoroacetoxy - androstan-3-one.

*Example VII*

In accordance with the method described in Example III, 2 g. of 17α-estradiol-3-methyl-ether were treated with 2-chloro-1,1,2-trifluorotriethylamine in acetonitrile, thus producing 3 - methoxy - 13α - fluoro - 17β - methyl - Δ¹,³,⁵⁽¹⁰⁾ - 18 - nor - estratriene, 3 - methoxy - 17β - methyl - Δ¹,³,⁵⁽¹⁰⁾,¹³ - 18 - nor - estratetraene, 3 - methoxy - 17β - fluoro - Δ¹,³,⁵⁽¹⁰⁾ - estratriene and 3 - methoxy - 17α - chlorofluoroacetoxy - Δ¹,³,⁵⁽¹⁰⁾ - estratriene, which were separated by chromatography.

In a similar but using 1-methyl-17α-estradiol-3-methyl-ether as starting material there were produced 3-methoxy-13α - fluoro - 1,17β - dimethyl - Δ¹,³,⁵⁽¹⁰⁾ - 18 - nor - estratriene, 3 - methoxy - 1,17β - dimethyl - Δ¹,³,⁵⁽¹⁰⁾,¹³ - 18 - nor - estratetraene, 3 - methoxy - 1 - methyl - 17β - fluoro - Δ¹,³,⁵⁽¹⁰⁾ - estratriene and 3 - methoxy - 1 - methyl - 17α - chlorofluoroacetoxy - Δ¹,³,⁵⁽¹⁰⁾ - estratriene.

I claim:

1. A compound of the following formula:

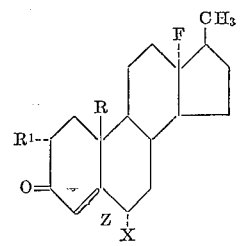

wherein R and R¹ are selected from the group consisting of hydrogen and methyl; X is selected from the group consisting of hydrogen, methyl, chlorine and fluorine, and Z is selected from the group consisting of a double bond and a saturated linkage between C–4, C–5.

2. 13α - fluoro - 17β - methyl - 18 - nor - Δ⁴ - androsten-3-one.

3. 13α - fluoro - 17β - methyl - 18,19 - bis - nor - Δ⁴ - androsten-3-one.

4. 13α - fluoro - 17β - methyl - 18 - nor - androstan - 3-one.

5. 2α,17β - dimethyl - 13α - fluoro - 18 - nor - Δ⁴ - androsten-3-one.

6. 2α,17β - dimethyl - 13α - fluoro - 18 - nor - androstan-3-one.

7. 6α,17β - dimethyl - 13α - fluoro - 18 - nor - Δ⁴ - androsten-3-one.

8. 6α - chloro - 13α - fluoro - 17β - methyl - 18 - nor - Δ⁴-androsten-3-one.

9. 6α,13α - difluoro - 17β - methyl - 18 - nor - Δ⁴ - androsten-3-one.

10. A compound of the following formula:

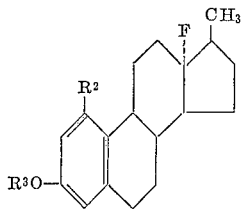

wherein R² is selected from the group consisting of hydrogen and methyl and R³ represents a lower alkyl group.

11. 3 - methoxy - 17β - methyl - 13α - fluoro - Δ¹,³,⁵⁽¹⁰⁾ 18-nor-estratriene.

12. 3 - methoxy - 1,17β - dimethyl - 13α - fluoro - Δ¹,³,⁵⁽¹⁰⁾-18-nor-estratriene.

13. 17β - methyl - 18 - nor - Δ¹³ - androsten - 3 - one.

14. 2α,17β - dimethyl - 18 - nor - Δ¹³ - androsten - 3 - one.

15. 6α,17β - dimethyl - 18 - nor - Δ¹³ - androsten - 3 - one.

16. A process for producing 13α-fluoro-17β-methyl-18-nor steroids of the androstane series which comprises treating a 17α-hydroxy-androstane compound with 2-chloro-1,1,2-trifluorotriethylamine.

References Cited by the Examiner

UNITED STATES PATENTS 3,053,735    9/62    Ercoli _____ 260—397.4
3,056,807    10/62    Ayer _____ 260—397.3

OTHER REFERENCES

Cross et al., "J. Med. Chem.," vol. 6, March 1963, pp. 198–200.

Knox et al., "Tetrahedron Letters," No. 26, Dec. 1962, pp. 1249–1255.

LEWIS GOTTS, *Primary Examiner.*